United States Patent Office 2,892,746
Patented June 30, 1959

2,892,746
METHOD OF MAKING SUBMERGED MELT WELDING COMPOSITION

Joseph H. Brennan, Niagara Falls, N.Y., assignor to Union Carbide Corporation, a corporation of New York No Drawing. Application August 23, 1956
Serial No. 605,695

4 Claims. (Cl. 148—26)

This invention relates to submerged melt welding compositions, and more particularly to an improved method of manufacturing such material.

Submerged melt welding compositions, which are generally silicates, are presently produced by melting the constituent oxides to complete fusion by employing heat in the form of electricity, gas or oil. Such compositions stem from the basic U.S. Patent 2,150,625 of Jones, Kennedy and Rotermund.

The manganese silicate type of flux is produced from manganese ore and siliceous material. All manganese ores contain phosphorus and arsenic in some quantity. Phosphorus and arsenic are undesirable constituents of a flux to be employed in flux welding.

This invention provides a new and rapid method of melting manganiferous fluxes in which a self-propagating charge is reacted exothermically.

It is an object of the present invention to provide a rapid exothermic process for producing fluxes suitable for submerged arc welding. It is a further object of the invention to effect a purification and substantially eliminate phosphorus and arsenic contained in the manganiferous constituents from the final flux. The method is particularly applicable to the production of fluxes which are substantially silicates, titanates and aluminates.

Other objects are to advance the art of submerged melt welding, and to provide an improved composition therefor.

In carrying out the invention, the constituents of a selected mixture are dried, ground preferably to 100 mesh and finer, and are intimately mixed. The mixture is charged to a suitable, refractory-lined vessel and the reaction is initiated with a small priming charge or by striking an electric arc. The charge is self-propagating but may be further heated electrically to facilitate a separation of the flux from metallic constituents.

The reaction which supplies the exothermic energy is as follows:

$$2MnO_2 + Si \rightarrow 2MnO + SiO_2$$

In calculating the charge, silicon in the form of silicon metal or ferrosilicon is proportioned stoichiometrically to the amount of $MnO_2$ present in the manganese ore. Small excesses of silicon are employed which will react with the iron, phosphorus and arsenic constituents of the charge. The reaction results in the formation of a fluid manganese silicate, titanate or aluminate and a small amount of metallic iron which will contain the phosphorus and arsenic present in the charge. An example of the invention for the production of a manganese silicate titanate flux employing a primer follows:

Example 1
MIX ORDERS

| | Size | Pounds |
|---|---|---|
| Primer: | | |
| Ferrosilicon-Aluminum | 100 M x D | 0.5 |
| Black African Mn Ore | 100 M x D | 2.75 |
| Charge: | | |
| 75% Ferrosilicon | 100 M x D | 2.2 |
| Black African Mn Ore | 100 M x D | 10.7 |
| Rutile | 100 M x D | 4.5 |
| Fluorspar | 100 M x D | 0.5 |

In another example the following mixture was employed:

Example 2

| | | |
|---|---|---|
| Black African Mn Ore | 100 M x D | 212 |
| 75% Ferrosilicon | 100 M x D | 42 |
| Rutile | 100 M x D | 71 |
| Chemical Fluorspar | 100 M x D | 8 |

A charge of 3¾ batches of the above mixture was fed continuously to an open-arc electric furnace with no energy supplied beyond the initial ignition until the chemical reaction was complete and the charge fluid. Energy was then supplied by the electric arc for a short time to hold the temperature and fluidity to permit complete separation of the metallics from the molten flux by gravity. The product was poured into three chills. The first two were essentially metal-free. The third chill, which was discarded, contained essentially all the metal plus a small amount of the submerged welding composition. The first two chills contained 712 pounds of material which, on analysis, had the following composition:

| | Percent |
|---|---|
| $MnO_2$ | Nil |
| $MnO$ | 49.01 |
| $SiO_2$ | 19.78 |
| $TiO_2$ | 22.38 |
| $CaF_2$ | 2.48 |
| $Al_2O_3$ | 3.14 |
| $FeO$ | 0.57 |
| $C$ | 0.01 |
| $As$ | 0.002 |
| $P$ | 0.005 |

An unexpected advantage of the present invention is that, although the original ore contained 0.039% arsenic and 0.097% phosphorus, and the rutile employed contained 0.01% phosphorus, it will be noted from the above analysis of the flux that phosphorus and arsenic were substantially eliminated and were contained in the small metallic produced.

The fused and chilled product was sized to 12 x 200 mesh and was employed in welding 14-gauge steel sheet according to the submerged melt process at welding rates of 150″ per minute and 200″ per minute. Entirely satisfactory welds were obtained in each case. The method used in making such welds is described in detail in the application Serial No. 476,055, "Electric Welding Medium Containing Manganese Oxide, Titania and Silica," by Clarence Evert Jackson and Arthur Edward Shrubsall, filed December 17, 1954, now U.S. Patent No. 2,755,211, issued July 17, 1956.

While, in the preceding examples, a manganese silicate titanate was produced, manganese silicates alone may be produced by substituting silica for the rutile employed, and silicate aluminates may be produced by substituting a calcined bauxite or other aluminous materials for the rutile shown. There may be wide variation in the composition of the final flux dependent on choice of raw materials.

While Black African manganese ore has been used illustratively in the examples shown, it will be understood that any manganese ore having a high $MnO_2$ content (50% and upwards) may be used in the process.

What is claimed is:
1. Method of manufacturing flux that is suitable for submerged melt welding flux, which comprises grinding and mixing ferrosilicon, Mn ore, rutile and fluorspar, exothermically reacting such mixture, separating any reduced metallics from the resulting melt, cooling the melt, and sizing the resulting product for use as submerged-melt arc welding flux.

2. Method of manufacturing flux that is suitable for submerged melt arc welding, which comprises grinding ferrosilicon, Black African Mn ore, rutile and fluorspar to a size of the order of 100 M x D and intimately mixed, melting by exothermically reacting such mixture characterized in that the principal reaction that occurs in the process is:

$$2MnO_2 + Si \rightarrow 2MnO + SiO_2$$

separating reduced metallics from the melt, cooling and crushing the resulting product to a size suitable for use as submerged melt arc welding flux.

3. Method of making submerged melt welding composition which comprises mixing a primer with a charge proportioned as follows:

|  | Size | Lbs. |
|---|---|---|
| Primer |  |  |
| Ferrosilicon-Aluminum | 100 M x D | 0.5 |
| Black African Mn Ore | 100 M x D | 2.75 |
| Charge: |  |  |
| 75% Ferrosilicon | 100 M x D | 2.2 |
| Black African Mn Ore | 100 M x D | 10.7 |
| Rutile | 100 M x D | 4.5 |
| Fluorspar | 100 M x D | 0.5 | exothermically reacting such mixture to produce a melt, separating reduced metallics therefrom, and sizing the resulting product for use as a submerged melt welding composition.

4. Method of manufacturing a substantially phosphorous free, arsenic free flux that is suitable for submerged melt arc welding flux, which comprises grinding and mixing ferrosilicon, manganese ore, fluorspar and at least one oxide from the group consisting of silica, titania and alumina, exothermically reacting such mixture to chemically reduce said manganese ore, separating any reduced metallics from the resulting melt, cooling the resulting melt and crushing the resulting melt to a size suitable for use as a submerged melt arc welding flux.

References Cited in the file of this patent

UNITED STATES PATENTS

| 2,043,960 | Jones et al. | June 9, 1936 |
| 2,474,787 | Landis et al. | June 28, 1949 |